United States Patent [19]
Viertl

[11] Patent Number: 4,920,319
[45] Date of Patent: Apr. 24, 1990

[54] METHOD AND APPARATUS FOR DETERMINING THE THICKNESS OF A COATING ON A METAL SUBSTRATE

[75] Inventor: John R. M. Viertl, Schenectady, N.Y.

[73] Assignee: General Electric Company, Schenectady, N.Y.

[21] Appl. No.: 153,292

[22] Filed: Feb. 3, 1988

[51] Int. Cl.⁵ ...................... G01N 25/00; G01N 25/18
[52] U.S. Cl. ......................................... 324/451; 374/7
[58] Field of Search ..................... 324/451, 106, 158 P; 374/7, 45

[56] References Cited

U.S. PATENT DOCUMENTS

| 2,750,791 | 6/1956 | Hanysz et al. | 374/7 |
| 2,972,882 | 2/1961 | Erwin | 324/451 |
| 3,016,732 | 1/1962 | Hanysz et al. | 374/7 |
| 4,419,416 | 12/1983 | Gupta et al. | 428/656 |

FOREIGN PATENT DOCUMENTS

| 624746 | 8/1961 | Canada | 324/451 |
| 110354 | 3/1957 | U.S.S.R. | |
| 768448 | 2/1957 | United Kingdom | |
| 858345 | 1/1961 | United Kingdom | 324/451 |

OTHER PUBLICATIONS

"Virginia Panel Corporation", catalog literature #104, Spring Contact Probes, 1983.
CRC Handbook of Chemistry and Physics; The Chemical Rubber Co.; pp. B-27, B-28; 1971.
Van der Ziel, Noise in Measurements, pp. 90–94, John Wiley & Sons, 1976.

Primary Examiner—Reinhard J. Eisenzopf
Assistant Examiner—Anthony L. Miele
Attorney, Agent, or Firm—Jerome C. Squillaro

[57] ABSTRACT

A system for non-destructively determining the thickness of a coating on a metal substrate includes using a first probe to locally heat the coating so as to establish a temperature gradient therein. The probe is configured so as to also provide electrical contact to the coating surface. This first probe is formed from a material having high thermal conductivity, and is at least partially plated with a material having high resistance to oxidation. Preferably, the probe plating material is chosen to also have high resistance to mechanical wear. The testing system also includes an electrical power supply for controllably heating the first probe in order to maintain the temperature thereof at a constant predetermined value. A second probe provides an electrical return contact in order to form a circuit for measuring the thermoelectric voltage between the two probes. This thermoelectric voltage may be conveniently measured by an AC amplification circuit. The thermoelectric voltage reading obtained may be processed by several different methods in order to provide the desired indication of the presence of a coating and/or its thickness. In one embodiment, the first probe is configured so as to be rollable along the coating surface, and the testing system further includes an electrical signal generator for determining the speed of movement of the rollable probe. In such an embodiment, the true coating thickness is determined from the measured thermoelectric voltage and the speed of movement of the probe.

13 Claims, 4 Drawing Sheets

METHOD AND APPARATUS FOR DETERMINING THE THICKNESS OF A COATING ON A METAL SUBSTRATE

FIELD OF THE INVENTION

This invention relates generally to the field of alloy-coated metal articles. More particularly, it relates to determining the thickness of the coating on the article. In one embodiment, the invention is especially useful for detecting the presence and thickness of the coatings which are typically applied to the metal components of a gas turbine in order to provide those components with the capability of withstanding high operating temperatures.

BACKGROUND OF THE INVENTION

In a number of applications, thin coatings of alloy materials are used on metal structures to protect them from the damaging effects of high temperature and/or corrosive or oxidizing environments. For example, in gas turbine engines many of the components must withstand high stress while enduring a corrosive gas stream whose temperature may be as high as 2500° F. In such an environment, protective coatings on the metal components are essential to the satisfactory performance of the turbine. In many conventional turbines, the metal components are comprised of the class of materials which have become known as "superalloys", and the protective coating is chosen from one of the materials known as MCrAlY coatings, where M is selected from the group consisting of iron, nickel, cobalt and certain mixtures thereof. Such substrate and coating compositions are well known in the art and are described in, for example, U.S. Pat. No. 4,419,416.

Since the coatings involved play such a vital role in protecting the underlying metal structures, it follows that it is also important that the coating be properly applied to the metal substrate during manufacturing. Hence, a necessary part of the quality control program for manufacturing such parts is to determine the thickness of the protective coating layer on the finished articles. Furthermore, if it is determined that the coating is somehow defective or that the metal substrate must be reworked for some other reason, then the coating must be stripped off and then reapplied to the reworked part. Such protective coatings are typically removed by a chemical etching process that preferentially attacks the coating. However, the chemical etchants conventionally used will also attack the exposed substrate surface if the etching process is allowed to continue for too long a period of time. For coatings which have been heat treated to form a diffusion bond between the coating and the substrate, allowing the etching process to continue for too long results in intergranular attack by the etchant on the substrate surface. When the coating is reapplied to a substrate which has been damaged by this type of intergranular attack, the coating will contain cracks. Due to variances in the stripping rate associated with such parameters as the bath temperature, concentration of the etchant, thickness variations of the coating on the part, etc., it is often very difficult to sufficiently control the etching process so as to ensure removal of the coating while simultaneously preventing stripping of the underlying substrate.

Thus, both for manufacturing new metal components having protective coatings thereon and for reworking existing ones, it is necessary to be able to determine the presence and thickness of the coating. For purposes of checking quality control, one method for making this determination would be to simply section a sample of the finished article and directly measure the coating thickness. Of course, the destructive nature of this type of determination limits its utility to applications where "spot checking" the coating presence and thickness is sufficient. For checking the coating thickness of parts which will be used in production and for detecting whether the coating has been removed from parts which are being reworked, a non-destructive testing system is needed. The system employed should be capable of being used for relatively complex part geometries, such as those which are conventionally utilized in turbine buckets. Preferably, the thickness of the coating is measurable even when the coating thickness varies with location on the part. Furthermore, the testing system should be capable of detecting relatively small coating thicknesses, even for coating compositions which are very similar to the composition of the underlying substrate.

It is well known that if two dissimilar metals are joined together, a thermoelectric potential exists across the metal junction. If the junction is either heated or cooled, a different thermoelectric potential will appear across the junction, with the difference between the two thermoelectric potentials being proportional to the difference in temperatures between the ambient condition and the heated or cooled state. This principle has been employed for many years to measure temperatures with metal-junction thermocouples. Furthermore, for a given temperature, the magnitude of the thermoelectric potential across a metal junction depends upon the composition of the metals which form the junction. Thus, instruments have been built for sorting materials by determining the thermoelectric potential across a junction formed between a metal of known composition and the material to be sorted, and then comparing the resulting thermoelectric potential to predetermined values associated with various junction compositions at the given temperature.

U.S.S.R. Pat. No. 110,354, filed on Mar. 26, 1957, discloses that a galvanic coating thickness can be determined by measuring the thermoelectromotive force in the base metal and its coating metal. The magnitude of the measured thermoelectromotive force is then compared with the values corresponding to various coating thicknesses at the temperature involved. According to that patent, the thermoelectromotive force is determined by connecting an electrical return to the base and contacting the coating material with a heated probe, and then measuring the magnitude of the resulting thermoelectromotive force by connecting a galvanometer between the probe and the electrical return. In the other method disclosed, the electrical return is replaced by a second heated probe. The subject patent further indicates that, for cases where contact with the base is not possible, the measurement may be made by using two probes of different materials, with each probe contacting the coating surface.

The present inventor has found that these prior art techniques and procedures do not produce satisfactory results when applied to the problem of determining the thickness of the protective coating which is applied to the metal components of a gas turbine engine. For such applications, the thermoelectric potential available from the metal junction formed at the coating/substrate interface is quite small because of the similarities in composition between the coating and the substrate. Hence, the apparatus utilized to measure the magnitude of the thermoelectric potential must be capable of discriminating the voltage signal from the background noise. The measurement obtained should also be relatively immune from the effects of thermal drift of the measuring circuit. In order to minimize the number of parameters that might vary from one reading to another, for varying coating thicknesses, and thereby increase the probability that the change in thermoelectric potential being measured is due to a corresponding change in coating thickness, it is preferable that a single heated probe is employed in the inventive apparatus rather than the two heated probes that are disclosed in the aforementioned U.S.S.R. Pat. No. 110,354. For similar reasons of simplicity it is also preferable that the two probes employed in the apparatus be constructed of the same material, even for measuring the coating thickness of an article for which contact between the second probe and the substrate is not possible. Moreover, for the types of probes which are conventionally employed to heat a metal surface, oxidation and/or corrosion of the probe surface, as well as mechanical wear of the probe tip caused by repeatedly touching the probe to the metal surface, can cause variations in the amount of heat transferred from the probe to the surface and thereby affect the thermoelectric potential readings obtained. Additionally, the present inventor has determined that, for common probe materials such as copper, small amounts of the probe material deposited on the coating surface by scuffing of the probe against the coating can form eutectics on the coating surface when subjected to the elevated temperatures encountered in the operating environment of a gas turbine. Due to these and other problems, the generally recognized and long-standing need in the metal plating/stripping industry for a system that provides non-destructive determination of the presence and thickness of a protective coating on a metal substrate has not been met by any of the concepts known in the prior art.

Accordingly, it is an object of the present invention to provide a method and apparatus for non-destructively determining the thickness of a coating on a metal component.

It is also an object of the present invention to provide a coating measurement system that is effective even for thin coatings and complex substrate geometries.

It is a further object of the present invention to provide a system for determining coating thicknesses in which the results obtained are not sensitive to the passage of time.

It is still another object of the present invention to provide an apparatus which is especially useful for determining the thickness of the protective coating on parts which are used in conventional gas turbines.

SUMMARY OF THE INVENTION

In accordance with one aspect of the present invention, an apparatus for determining the thickness of a coating on a metal substrate comprises first and second probes and means for measuring the thermoelectric voltage between the first and second probes. The first probe serves to locally heat the coating, so as to establish a temperature gradient therein, and to provide an electrical contact to the coating. The first probe is formed from a material having high thermal conductivity and is at least partially plated with a material having high resistance to oxidation. The second probe provides an electrical return contact in order to complete the thermoelectric voltage measuring circuit. The apparatus also includes meas for controllably heating the first probe so that the temperature thereof is maintained at a predetermined value. Preferably, the probe plating material is chosen to have high resistance to mechanical wear. The voltage measuring means may conveniently comprise an AC amplification circuit.

In order to provide a "go/no go" type of testing system, the apparatus of the present invention may also include means for converting the measured thermoelectric voltage to a binary logic signal which represents the presence or absence of a coating having a specified thickness. Additionally, in order to minimize errors in the coating thickness measurement due to the coating being delaminated from the substrate, the inventive apparatus may further include means for determining the rate of heat flow from the first probe to the coating, which heat flow rate is significantly less for a delaminated coating than for an intact one. The apparatus of the present invention is also capable of providing coating thickness data as a function of location on the coated substrate. In this latter embodiment, the first probe is further configured so as to be rollable along the surface of the coating, and the apparatus further comprises means for determining the speed of rotation of the rollable probe. This embodiment of the apparatus also includes means for determining the true coating thickness, based on the measured thermoelectric voltage and on the speed of rotation of the probe.

In accordance with the method of the present invention, the first probe is controllably heated so as to maintain the temperature thereof at a predetermined value, and is disposed so as to heat the coating and establish a temperature gradient therein. The first probe is further disposed so as to provide an electrical contact to the coating. With the second probe also disposed so as to provide an electrical contact, the thermoelectric voltage between the two probes is measured when the first probe is disposed in electrical contact with the coating. In one embodiment, the first probe is heated to a temperature of 450° C.

In order to minimize errors in the coating thickness data due to drift of the testing system's operating characteristics, a reference potential may be established for the specimen being tested by measuring the thermoelectric voltage when both probes are in electrical contact with the substrate. In order to do so, the heated first probe is disposed so as to provide an electrical contact to the substrate and so as to locally heat the substrate and establish a temperature gradient therein. The thermoelectric voltage between the first and second probes is then measured. By comparing the thermoelectric voltage obtained when the first probe is in contact with the coating to that obtained when the first probe is in contact with the substrate, the presence and thickness of a coating on the substrate can be determined. Alternatively, if the first probe cannot be placed in contact with the substrate, the thickness of the coating can be determined by comparing the thermoelectric voltage obtained when the first probe is in contact with the coating to a plurality of predetermined values which represent known coating thicknesses for the type of specimen being tested.

In one particularly useful embodiment, the thermoelectric voltage obtained when the first probe is in contact with the substrate is used to establish a zero reading for the apparatus. An adjustable threshold voltage level is set above this zero reading so as to slightly exceed the noise level for the voltage signal. Measured thermoelectric voltages less than the threshold level are then set to logic zero, and those greater than the threshold level are set to logic one. The resulting binary output signal can then be used to provide an indication of the presence or absence of a coating having a specified thickness.

BRIEF DESCRIPTION OF THE DRAWINGS

The subject matter which is regarded as the invention is particularly pointed out and distinctly claimed in the concluding portion of the specification. The invention itself, however, both as to its organization and its method of practice, together with further objects and advantages thereof, may best be understood by reference to the following description taken in conjunction with the accompanying drawings, in which:

DETAILED DESCRIPTION OF THE PREFERRED EMBODIMENTS

Figure 1:
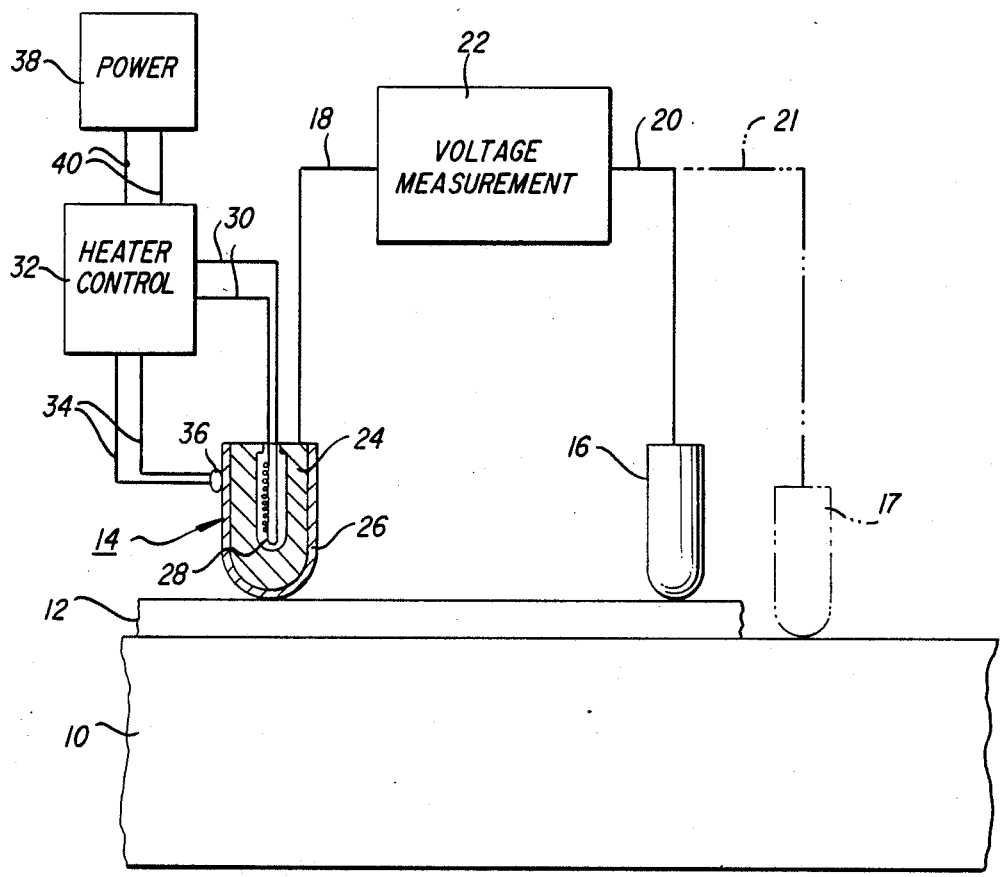
FIG. 1 is a side elevation view in partial cross section schematically illustrating one embodiment of an apparatus for determining the thickness of a coating on a substrate, in accordance with the present invention.

One embodiment of a coating thickness measurement system in accordance with the present invention is schematically illustrated in FIG. 1. As shown therein, apparatus for determining the thickness of coating 12 on substrate 10 comprises first probe 14 disposed so as to provide an electrical contact to coating 12. First probe 14 is configured for locally heating coating 12 so that a temperature gradient is established therein. Second probe 16 is disposed so as to provide an electrical return contact for the voltage measurement circuit. As will be discussed further hereinbelow, the second probe may be disposed in electrical contact with coating 12, in the manner shown in FIG. 1 by probe 16, or with substrate 10, in the manner illustrated by the dotted lines in FIG. 1 for probe 17. Voltage measurement circuit 22, for measuring the thermoelectric voltage between probes 14 and 16, is connected to probe 14 by electrical connector 18 and to probe 16 by connector 20. (If probe 17 is used in place of probe 16, probe 17 is connected to voltage measurement circuit 22 by connector 21.) The apparatus of the present invention further comprises heater control circuit 32 for controllably heating probe 14 so that the temperature thereof is maintained at a predetermined value. The thermoelectric potential at thermocouple 36, which measures the temperature of probe 14, is transmitted to heater control 32 via electrical connectors 34. Heater control 32 receives electrical power from power source 38 through connectors 40. If the temperature being sensed at thermocouple 36 is less than the predetermined temperature required for probe 14, the electrical power received by heater control 32 is relayed to probe 14 via electrical connectors 30. Heater coil 28 is attached to the ends of connectors 30 and is located in probe 14 so that regulation of the current flow through heater coil 28 maintains the temperature of probe 14 at the predetermined value.

Figure 5:
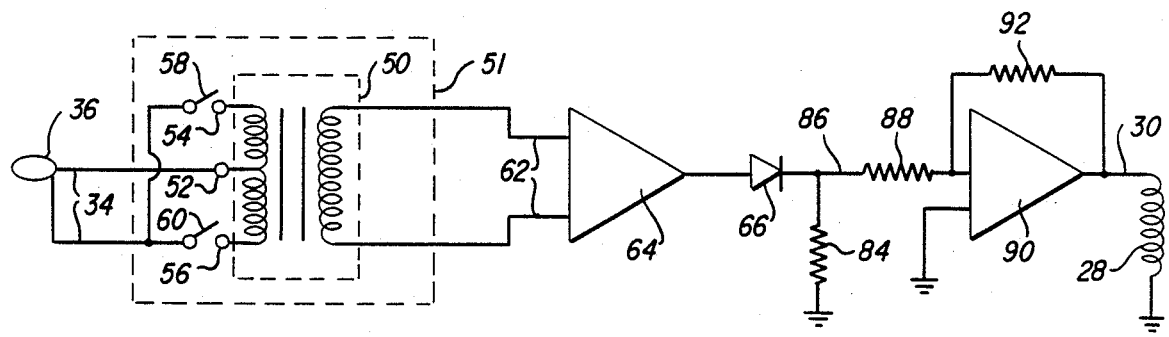
FIG. 5 illustrates one embodiment of an electrical circuit for providing the probe heater of the present invention with feedback control.

One embodiment of a feedback circuit that may be employed for heater control 32 is illustrated in FIG. 5. The circuit shown employs multivibrator switch 51 to chop the DC thermoelectric potential from thermocouple 36 into an AC signal. One of conductors 34 from thermocouple 36 is connected to center tap 52 of transformer 50 included in multivibrator switch 51. The remaining conductor 34 is connected via a pair of switches 58 and 60 to opposite ends 54 and 56 of the transformer primary. Switches 58 and 60 operate so that when one switch is closed, the other is open. Thus, the current through the transformer primary alternately flows in one direction and then in the other. As a result an AC signal is induced in the secondary side of transformer 50, which signal is amplified by amplifier 64 and rectified by diode 66. The output signal across output resistor 84 is therefor a DC signal which is proportional to the temperature sensed by thermocouple 36. This DC signal passes through input resistor 88 and power amplifier 90 and is applied to heater coil 28. The DC gain of amplifier 90 is controlled by the feedback loop which contains feedback resistor 92. The circuit shown in FIG. 5 thus operates to regulate the current supplied to heater coil 28 as a function of the temperature being sensed by thermocouple 36.

Probe 14 is shown in cross section in FIG. 1 in order to illustrate the structure of the heated probe of the present invention. As shown therein, material 24 which forms the bulk of probe 14 is at least partially plated by plating material 26. For optimum operation of the testing system of the present invention, heated probe 14 is configured to act as a heat reservoir. In addition, when probe 14 is contacted to coating 12 in order to provide local heating of coating 12 and to establish a temperature gradient therein, it is desirable that heat be transferred from probe 14 to coating 12 at a high rate. Preferably, probe 14 is configured so that the rate of heat transfer from probe 14 to coating 12 is sufficient so that the overall transfer of heat from probe 14 through coating 12 to substrate 10 is not limited by the rate of heat flow from probe 14 to coating 12, but rather is limited by the flow of heat through coating 12 to substrate 10.

To provide these characteristics, it is desirable that probe 14 be formed from a material having high thermal conductivity. When such is the case, probe 14 acts as a heat reservoir which can be maintained at a constant temperature by the heater control circuit. High thermal conductivity also minimizes thermal gradients in the probe itself. Since, when probe 14 is placed in contact with coating 12, cooling of probe 14 is primarily due to heat transfer from probe 14 to coating 12, a probe having this type of high thermal conductivity and minimal internal thermal gradients will approximate a point heat source. (Some heat transfer from probe 14 to the surrounding air also occurs, but the magnitude of such heat transfer is minimal compared to the heat transfer from probe 14 to coating 12.)

Since copper is a material having very high thermal conductivity, it is the material that has most frequently been employed in the past to form the type of probe required for the present invention. However, copper oxidizes at a relatively low temperature. The present inventor has found that maintaining a copper probe at the probe temperatures which are desirable for the present invention results in the formation of an oxidation layer on the probe surface. This build up of oxidation products on the probe surface reduces the flow of heat from the probe to the coating to such an extent that the resulting heat transfer from the probe to the coating is insufficient to obtain accurate coating thickness measurements. For this reason, the heated probe of the present invention is plated, at least in the area of contact between probe 14 and coating 12, with a material having high resistance to oxidation.

The present inventor has also found that when such thermally conductive materials as copper and gold are used for the probe, touching probe 14 to coating 12 often produces a scuffing effect which leaves a small amount of the probe material on the surface of coating 12. When the coated parts are then subjected to the temperatures which are found in the operating environment of such gas turbines as jet engines, the material deposited on the coating surface by the testing apparatus reacts with the coating to form a eutectic or other compound which weakens the coated structure at elevated temperatures. In order to avoid this problem, it is preferable that the plating material comprise a metal selected from the group consisting of platinum, rhodium, iridium, and palladium. The temperature required for these materials to form eutectics is higher than the temperature encountered in most gas turbine applications.

Yet another problem with conventional heating probes is that the scuffing produced by touching the probe to the surface to be heated tends to wear away and flatten the probe tip. When the shape of the probe tip is changed by this type of mechanical wear, the heat transfer characteristics of the probe are also changed, resulting in "drift" of the measurement data. Thus, even for applications where the formation of eutectics is not a concern, wearing away of the probe tip caused by use of the testing apparatus produces undesirable variations in the coating thickness data obtained. Consequently, for the probe of the present invention, the plating material preferably comprises a material having high resistance to mechanical wear. One such material is rhodium. The thermal conductivity of rhodium is not as high as that of such metals as gold and copper, but it exhibits high resistance to both oxidation and mechanical abrasion. In accordance with the present invention, the rhodium plating comprises a very thin layer, so that the effect on heat transfer from the probe to the substrate coating is minimal. In one embodiment, the plating thickness is approximately 0.0002 inches. In order to combine the properties of high thermal conductivity, oxidation resistance, and resistance to mechanical wear or abrasion, the probe of the present invention may comprise either copper plated with rhodium or gold plated with rhodium.

Figure 2:
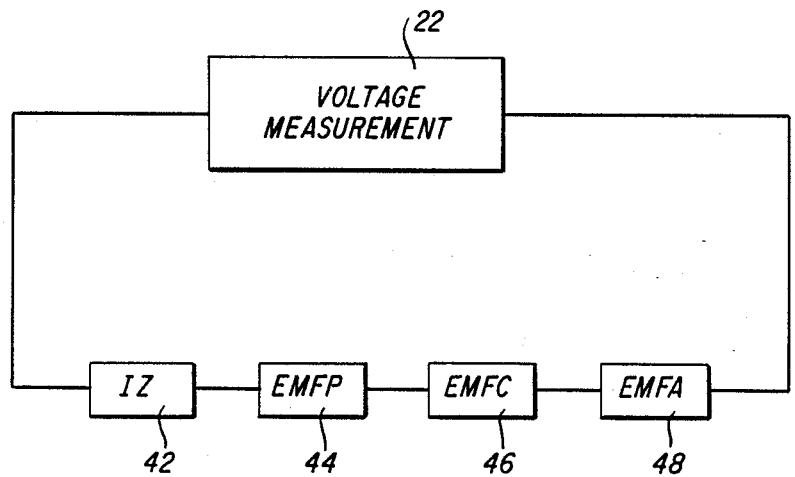
FIG. 2 is a block diagram showing an equivalent circuit for the thermoelectric voltages generated in the apparatus of FIG. 1.

FIG. 2 schematically illustrates the electric potentials which are generated in the apparatus shown in FIG. 1. Connected in series with voltage measurement apparatus 22 are thermoelectric voltages 44, 46, and 48, as well as ohmic voltage 42. Voltage 42 is generated by current flow through the effective impedance of the circuit. Thermoelectric voltage 44 is generated at the bimetal junction which is formed by the interface between probe 14 and coating 12. In a similar fashion, voltages 46 and 48 are generated, respectively, at the interface between coating 12 and substrate 10 and at the interface between probe 16 and coating 12 (between probe 17 and substrate 10 if the second probe is contacted directly to substrate 10). Thermoelectric voltages would also be generated at every other location in the measuring circuit where a junction of two different metals is formed. However, the thermoelectric potentials associated with those junctions are generally so small in comparison to thermoelectric voltages 44, 46, and 48 that they have no measurable effect on the overall thermoelectric voltage of the measuring circuit. For that reason, they are not shown in FIG. 2.

When heated probe 14 is placed in contact with coating 12, the resulting heat flow from probe 14 through coating 12 to substrate 10 acts to increase the temperature of coating 12 and, to a lesser extent, the temperature of substrate 10. If probe 14 is left in contact with coating 12 long enough to establish a local temperature gradient therein, the temperature at the probe/coating interface will be somewhat greater than the temperature at the coating/substrate interface, and both of these temperatures will be much greater than the temperature at the interface between probe 16 and coating 12. Assuming that the heat generating capacity and thermal conductivity of probe 14 are high enough so that probe 14 acts as a heat reservoir, the temperature at the interface between probe 14 and coating 12 will remain generally constant for all coating thickness measurements. Furthermore, if probe 16 is located outside of the area of local heating in coating 12 that is produced by probe 14, the interface between probe 16 and coating 12 remains at the ambient temperature for all coating thickness measurements. With the temperatures of these two interfaces remaining constant for all coating thicknesses, thermoelectric voltages 44 and 48 also remain constant. Additionally, although heating of coating 12 may lower its electrical resistance somewhat, the overall current flow and effective impedance through the circuit shown in FIG. 2 remains generally constant for all coating thickness measurement. Thus, the only voltage that varies by an appreciable amount as the thickness of coating 12 is changed is thermoelectric voltage 46 associated with the interface between coating 12 and substrate 10. Because of the temperature gradient established in coating 12 by the heat transferred from probe 14, the temperature of the interface between coating 12 and substrate 10 varies directly with the thickness of coating 12. If the thermal conductivity of coating 12 is constant throughout its thickness, the temperature gradient will be substantially uniform and the temperature at the coating/substrate interface will decrease proportionally as the coating thickness increases. Hence, each different coating thickness will produce a different value for thermoelectric voltage 46, and the differences between the voltages obtained for various coating thicknesses can be used to determine the coating thickness associated with a particular voltage level. Of course, as coating 12 becomes very thick the amount of heat reaching the interface between coating 12 and substrate 10 will eventually be reduced to zero. Accordingly, any further increase in the coating thickness will not produce a measurable change in the level of voltage 46, with the result being that further increases in the coating thickness are not detectable. For this reason, the range of coating thicknesses that can be determined by the apparatus of the present invention depends upon the thermal gradient that can be established in coating 12 by probe 14. The thermal gradient depends, in turn, upon the heat that is transferred from probe 14 to coating 12. The amount of this heat flow is primarily dependent upon the temperature of the probe, the thermal conductivity of the material that the heat is passing through, and the area of contact between the surface of the coating and the surface of the probe. When two surfaces are placed in contact and held together by a moderate force, a contact deformation region is created. The resulting contact region is generally oblong in shape and can be described by semi-minor and semi-major axes. These axes can be related to the effective radius of heat penetration from one surface to the other. The smaller the magnitude of this effective radius, the larger the tendency for the heat to spread sidewardly in a direction along the surface rather than in a direction normal to the surface. For the purposes of this invention, in order to provide good heat transfer from the surface of probe 14 to coating 12, the present inventor has found that probe 14 should be designed so that the effective radius of the contact region between the surfaces of probe 14 and coating 12 is approximately the same length as the thickness of coating 12. The appropriate contact region can be conveniently provided by a probe having the oval cross-sectional shape shown in FIG. 1, with the diameter and radius of the probe tip being chosen to match the requirements for a particular application.

Several conventionally available circuits may be employed for voltage measurement apparatus 22. In one embodiment, the voltage measuring circuit comprises means for converting the thermoelectric voltage between probes 14 and 16 into an AC signal. The AC signal is then amplified, and the amplified AC signal is rectified to form an output signal. AC amplification is generally preferred over DC amplification for the voltage measurement circuit because the thermoelectric potentials being measured by the circuit are very small. At least for gas turbine applications, the composition of coating 12 is very similar to that of substrate 10, so that the thermoelectric potential generated by the interface between coating 12 and substrate 10 is relatively small, even when the temperature of the interface is elevated by heating coating 12 with probe 14. The thermoelectric potentials obtained are small enough that, if they are measured by a DC amplification circuit, the circuit output is quite sensitive to thermal drifts within the amplifying circuit. On the other hand, typical AC amplification circuits isolate the input signal from the effects of amplifier thermal drift.

Figure 3:
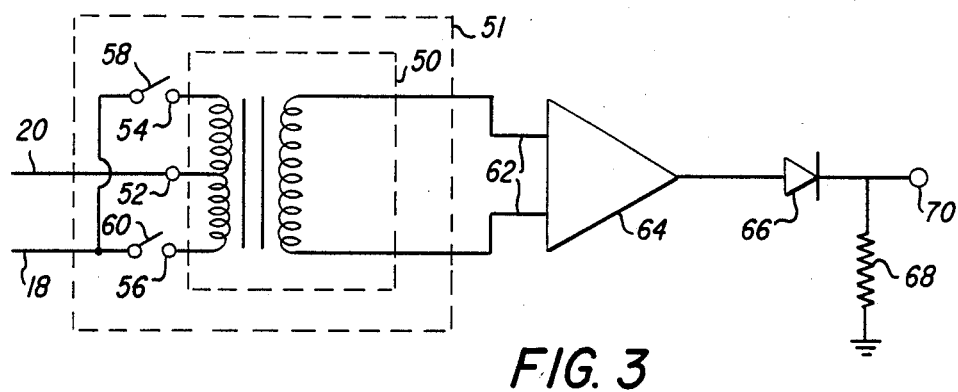
FIG. 3 is a circuit diagram illustrating one embodiment of a circuit that may be employed as the voltage measurement apparatus shown in FIG. 1.

One embodiment that may be employed for voltage measurement apparatus 22 is illustrated in FIG. 3. Multivibrator switch 51 chops the DC voltage produced between heated probe 14 and return probe 16 and converts it to an AC signal which appears across the output of switch 51. Conductor 20 connects probe 16 to center tap 52 of transformer 50, and conductor 18 connects probe 14 to opposite ends 54 and 56 of the primary coil of transformer 50. When switches 58 and 60 are alternately operated so that one is closed while the other is open, the resulting current flow through the primary coil of transformer 50 induces an AC signal in the secondary coil thereof in the same manner as was described hereinabove in relation to FIG. 5. This AC signal is fed to amplifier 64 via connectors 62. The amplified signal is rectified by diode 66. The resulting signal at output 70 produces a voltage across output resistor 68 which can be correlated to the potential between probes 14 and 16, given the gains of the circuitry.

In an alternative embodiment to that shown in FIG. 3, multivibrator switch 51 is replaced by a semiconductor switching device. For certain applications, such an embodiment may provide desirable advantages in speed, cost, etc. However, since the "on" resistance of semiconductor switches is typically much higher than the "on" resistance of multivibrator switches, the latter provides a better impedance match to the portion of the measurement circuit which is located between conductors 18 and 20. Additionally, although not shown in FIGS. 3 and 5, devices could be added to the circuitry shown to gate amplifier 64 on and off at the same frequency as the rate at which switches 58 and 60 of multivibrator 51 open and close. With appropriate adjustment for the phase differences between multivibrator switch 51 and amplifier 64, the resulting match between the operation of switch 51 and amplifier 64 eliminates any spurious and transient signals that might otherwise be picked up by amplifier 64 when the input signal appearing across conductors 18 and 20 is disconnected from amplifier 64 by switch 51. Synchronous operation of switch 51 and amplifier 64 thereby acts to suppress the noise level of the amplified signal. This type of synchronous detection is well known in the art and is described in, for example, pages 90-94 of the textbook by Aldert Van der Ziel entitled *Noise in Measurement* (John Wiley and Son, 1976).

Figure 4:
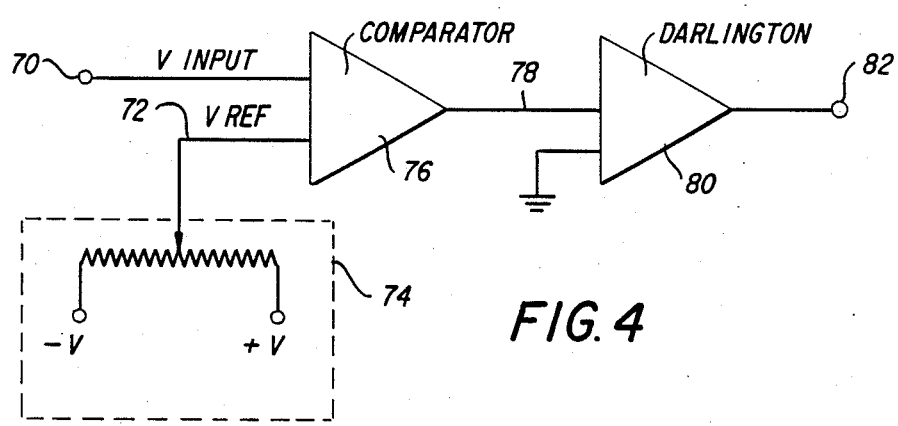
FIG. 4 is a circuit diagram which illustrates one embodiment of an electrical circuit that may be utilized to compare the output of the circuit shown in FIG. 3 with an adjustable threshold level, in order to provide the voltage measurement circuit with a binary output.

The voltage appearing at output 70 may be used in several ways to indicate the coating thickness. In one embodiment, the apparatus of the present invention further includes means for comparing the measured thermoelectric voltage to a plurality of predetermined values which represent known coating thicknesses. In such an embodiment, the voltage at output 70 could be successively compared to a series of reference voltages which correspond to the known coating thicknesses. In another embodiment, the voltage at output 70 is converted to a binary logic signal. One embodiment of a circuit for doing so is shown in FIG. 4. Comparator 76 determines whether the voltage at output 70 is greater than or less than the reference voltage appearing at input 72 of comparator 76. The output of comparator 76 is transmitted to the input of Darlington circuit 80 via conductor 78. The signal appearing at output 82 of Darlington circuit 80 is either a logic low level or a logic high level, depending upon the level of the input signal to Darlington circuit 80. The reference voltage for comparator 76 may be adjusted by threshold level adjustment 74 to match the voltage which corresponds to a specific coating thickness. The binary logic signal at output 82 then indicates the absence or presence of a coating having the specified thickness.

In an alternative embodiment to that shown in FIG. 1, the apparatus of the present invention is further configured so that the first probe is rollable along the surface of coating 12. Such an embodiment allows the coating thickness to be continually measured along the surface of a particular part, and is especially useful for applications where the coating thickness varies as a function of location on the part involved. By using a suitable position encoding scheme, the coating thickness for a particular part could even be "mapped" for any desirable portion of the part's surface. When the first probe is configured to be rollable, the coating thickness measuring apparatus further comprises means for determining the speed of rotation of the rollable probe, and means for determining the true coating thickness by taking into account the speed of rotation of the rollable probe.

Figure 6:
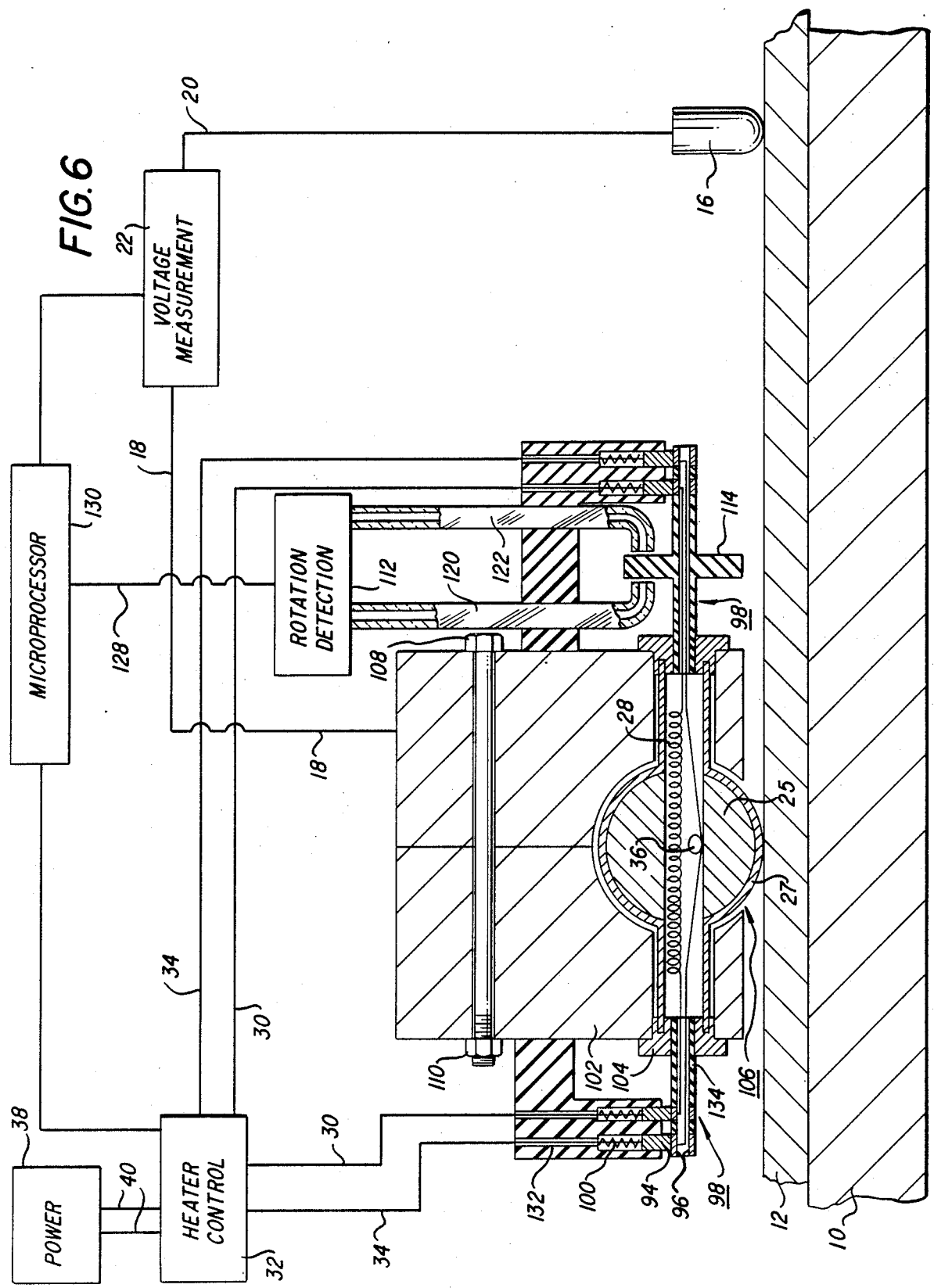
FIG. 6 is a side elevation view in partial cross section schematically illustrating another embodiment of a coating thickness measurement apparatus, in accordance with the present invention.

One embodiment of a testing system which employs this type of rollable probe is schematically illustrated in FIG. 6. Similar to the apparatus of FIG. 1, the testing system shown in FIG. 6 includes power source 38 and heater control 32 for controllably heating probe ball 106 by passing current through heater coil 28. Thermocouple 36 monitors the temperature of probe ball 106. Probe ball 106 is disposed in probe housing 102 so as to be rotatable about an axis which extends in a horizontal direction with respect to probe housing 102. Similar to probe 14 shown in FIG. 1, probe ball 106 is formed from material 25 having high thermal conductivity and is plated with plating material 27 which has high resistance to oxidation. Sleeve bearings 104 allow probe ball 106 to freely rotate with respect to the adjacent portions of probe housing 102. Probe housing 102 is formed in two sections to allow ease of assembly of the movable probe, and the two sections are held together in the assembled unit by at least one assembly bolt 108 and corresponding nut 110.

Conductors 30 are connected to heater coil 28, and conductors 34 are connected to thermocouple 36, via electrically conductive brushes 94 and associated electrically conductive portions 96 of shaft 98. Brushes 94 are maintained in contact with conductive portions 96 by springs 100. Other conventional slip ring contact arrangements which provide the necessary contact between heater control 32 and probe ball 106 may also be utilized in place of brushes 94 and conductive shaft portions 96. Whichever contact arrangement is chosen must also electrically insulate the conductors for heater coil 28 and thermocouple 36 from the portions of housing 102 which form part of the circuit between conductors 18 and 20, which circuit is used for measuring the thermoelectric voltage between the heated and return probes. In the embodiment of FIG. 6, insulative brackets 132 and insulative portions 134 of shaft 98 provide this type of isolation.

Figure 7:
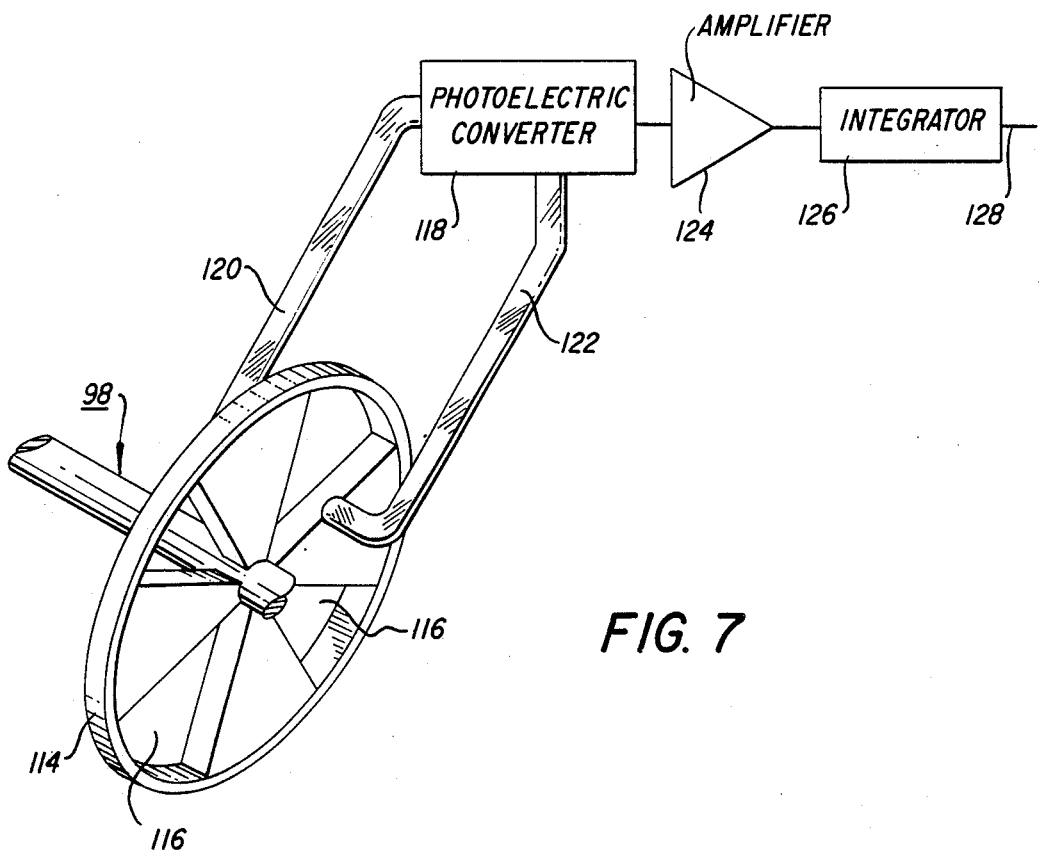
FIG. 7 is a perspective view schematically illustrating one embodiment that may be employed for the rotation detection apparatus shown in FIG. 6.

The apparatus of FIG. 6 also includes rotation detection apparatus 112 for determining the speed of rotation of probe ball 106. As is better illustrated in FIG. 7, in one embodiment, wheel 114 having slots 116 disposed therein in a "spoke-like" fashion is attached to probe shaft 98. Photoelectric convertor 118 transmits light to fiberoptic conduit 120 which is disposed so that the outlet opening thereof is located adjacent the slotted portions of wheel 114. Fiberoptic conduit 122 is disposed so that it also has an opening located adjacent the slotted portions of wheel 114, on the side of wheel 114 that is opposite the side where conduit 120 is located. When wheel 114 is in a position such that one of slots 116 is aligned with the openings of conduits 120 and 122, the light transmitted to conduit 120 by photoelectric convertor 118 passes through slot 116 and is directed back to photoelectric convertor 118 via conduit 122. The light received by convertor 118 via conduit 122 is converted to an electrical signal which is amplified by amplifier 124. Integration of the amplified signal in integrator 126 results in a voltage level at output 128 which is proportional to the speed of rotation of probe ball 106.

Similarly to the embodiment shown in FIG. 1, return probe 16 is connected to voltage measurement apparatus 22 by conductor 20. Probe ball 106 is connected to the voltage measurement circuit by a combination of conductor 18 and various electrically conductive portions of the rolling probe assembly. Conductor 18 is electrically connected to probe housing 102, which is formed from an electrically conductive material. Housing 102 is in contact with bearing 104 which, in turn, is in contact with probe ball plating 27. Since bearing 104 and plating 27 are each formed of electrically conductive material, a closed circuit is formed between conductors 18 and 20. Any additional thermoelectric voltages which are generated in the circuit at the interfaces between the various metal components will be substantially constant for all coating measurements, and therefore will not impede the coating thickness determination.

Microprocessor 130 performs the function of determining the true coating thickness from the data obtained. Microprocessor 130 receives the output from voltage measurement apparatus 22 and the output from rotation detection apparatus 112, and appropriately modifies the thermoelectric voltage measurement to take into account the speed of rotation of probe ball 106.

As can be seen from the above discussion, the inventive method for determining the thickness of a coating on a substrate comprises controllably heating a first probe so as to maintain the temperature of the probe at a predetermined value. The heated probe is formed from a material having high thermal conductivity and is plated with a material having high resistance to oxidation, in the manner illustrated in FIG. 1 by probe 14. The heated probe is disposed so as to locally heat the coating and establish a temperature gradient therein, while also providing an electrical contact to the coating. A second probe is disposed so as to provide an electrical return contact to the coated substrate, and the thermoelectric voltage between the first and second probes is measured when the first probe is in electrical contact with the coating. As is illustrated in FIG. 1, the second probe may be disposed so as to be an electrical contact with either coating 12 or substrate 10. Moreover, the thermoelectric voltage measurement obtained is substantially independent of the choice between substrate 10 and coating 12 for the electrical return contact. Theoretically, since the chemical composition of coating 12 is somewhat different from that of substrate 10, the thermoelectric potential generated at the interface between probe 16 and coating 12 is different from that generated at the interface between probe 16 and substrate 10. However, for either of these two junctions, the thermoelectric potential generated at ambient temperature is so much smaller than the thermoelectric potential generated at the interface between coating 12 and substrate 10 when that interface is heated by probe 14, that the overall thermoelectric potential measured by voltage measurement apparatus 22 when probe 16 is in contact with coating 12 is not discernably different from that measured when probe 16 is in contact with substrate 10. Because of this fact, the testing system of the present invention allows accurate determination of the coating thickness even when the location of the return probe must be changed from coating 12 to substrate 10, or vica versa, in making measurements for a series of parts. Of course, as the temperature of probe 14 and the associated heating of the interface between coating 12 and substrate 10 is reduced, the contribution to the overall thermoelectric potential due to the interface between probe 16 and the coated substrate becomes larger. The present inventor has determined that heating probe 14 to a temperature of about 450° C. is sufficient to assure the results described above.

As was discussed hereinabove in relation to FIGS. 3 and 4, the step of measuring the thermoelectric voltage between the first and second probes preferably comprises converting that voltage into an AC signal and then amplifying it. The amplified AC signal can then be rectified, and the resulting output voltage can be further processed to provide a suitable indication of coating presence and/or thickness. If the part being tested has an uncoated portion which is accessible to the heated probe, the heated probe can be placed in electrical contact to the substrate and the resulting thermoelectric voltage between the first and second probes can be measured. The thermoelectric voltage thus obtained can be utilized as a reference of comparison for the voltages obtained when the heated probe is placed in contact with various thickness coatings. In one embodiment, the difference between the voltage level obtained when the heated probe is placed in contact with the coating of a particular specimen and the voltage obtained when the probe is placed in contact with the substrate is compared to a plurality of predetermined values for this difference in the voltage level, with these predetermined values being chosen to represent known coating thicknesses. Alternatively, if the substrate of the part being tested is not accessible, reference may be made to the thermoelectric voltage obtained when the heated probe is contacted to the substrate of a part of the same type as that being tested, in order to correlate the voltage reading for the part being tested to the thickness of the coating for that part.

In another embodiment, the measured thermoelectric voltage is converted to a binary logic signal which represents the presence or absence of a coating having a specified thickness. This embodiment is particularly useful for "go/no go" type of testing. The thermoelectric voltage obtained for a specified thickness coating can be used to establish a threshold level. The thermoelectric voltages obtained for the coatings on parts being tested can then be compared to the threshold level, and voltages exceeding this threshold can be set to a logic one. Voltages less than the threshold level are set to a logic zero. The resulting binary output provides a go/no go indication of whether a coating is present on the part which exceeds the specified coating thickness.

To improve the reliability of the coating thickness readings obtained using the present invention, a determination may be made of whether the coating being tested is delaminated from the substrate in the area of local heating by the heated probe. If a space exists between the coating and the substrate in that area, the bimetal junction that would otherwise be formed at the coating/substrate interface will be affected, and the contribution associated with that interface to the overall thermoelectric voltage will be reduced significantly. The resulting voltage measurement will therefore be erroneous, and may indicate that a very thick coating is present when, in fact, the coating is defective. The presence of a delaminated coating can be determined by determining the rate of heat flow from the heated probe to the coating. The space between the coating and the substrate associated with the delaminated area impedes the flow of heat from the coating to the substrate and, correspondingly, the heat flow from the probe to the coating. Consequently, the rate of change in the probe temperature when the probe is contacted to the coating will be significantly different for a well attached coating than it is for a delaminated one. One method for determining the rate of change of the probe temperature is to electrically pulse the probe heater at a first frequency, and measure the thermoelectric potential at a frequency which is twice that of the first frequency. Such a determination can be carried out using conventionally available phase-linked synchronous detectors.

The effects of erroneous readings may also be reduced by taking multiple readings at various locations on a particular coating surface and then calculating the mean value and the variance for the plurality of measured thermoelectric voltages. By averaging several measurements, a coating thickness determination is obtained which is better representative for a given coating, especially when the coating surface is not perfectly smooth but rather has a textured appearance. The variance between the mean and individual readings may be utilized to weed out readings which deviate from the mean value by such a magnitude that the validity of the individual reading is questionable.

When the apparatus of FIG. 6 is employed, the method of the present invention further comprises moving the heated probe along the surface of the coating. The speed of movement of the probe is determined, and the true coating thickness is determined from the measured thermoelectric voltage and from the speed of movement of the probe. As the rolling probe moves along the coating surface it continually contacts a different portion thereof. Depending upon the speed of movement of the probe, the period of time that the probe surface is in contact with a particular portion of the coating surface may not be long enough for temperature equilibrium to be established between the two surfaces. In that event, the temperature gradient established within the coating will depend upon how long the two surfaces are in contact. The speed of movement of the probe must be low enough that the heat transferred from the probe to the coating is sufficient to elevate the coating/substrate interface temperature. For the rolling probe embodiment shown in FIG. 6, a first order approximation is that a linear relationship exists between the speed of rotation of probe ball 106 and the amount of heat transferred between probe ball 106 and coating 12. For a particular testing apparatus, calibration procedures can be utilized to establish the exact relationship between the speed of movement of the probe and the resulting thermoelectric voltage measurement for a coating of a particular thickness. For example, the thermoelectric voltage between the rollable probe and the return probe may be measured when the probe is held stationary, and the measurement may be repeated for various movement speeds. The data obtained will form a plot from which the difference between the apparent coating thickness (obtained when the probe is moved at a particular speed) and the true coating thickness (when the probe is stationary) can be determined. This procedure can be repeated for coatings having various thicknesses, and the resulting reference data can be utilized to correct the thermoelectric reading for a particular specimen, which is tested at a known speed, to a voltage reading which corresponds to the true coating thickness.

The foregoing describes a system for non-destructively determining the thickness of a coating on a metal component. The present invention provides a coating measurement system that is effective even for thin coatings and for complex substrate geometries. The features incorporated into the inventive testing system provide coating thickness data which is not sensitive to the passage of time, which sensitivity can be caused by such factors as oxidation and mechanical abrasion of the testing system's components. Because of the characteristics exhibited by the coating measurement system of the present invention, it is especially useful for determining the thickness of the protective coating on parts which are used in conventional gas turbines.

While the invention has been described in detail herein in accord with certain preferred embodiments thereof, many modifications and changes therein may be effected by those skilled in the art. For example, it should be understood that the principles of the present invention would also apply if the temperature change at the coating/substrate interface was produced by cooling, rather than by heating. Accordingly, it is intended by the appended claims to cover all such modifications and changes as fall within the true spirit and scope of the invention.

The invention claimed is:

1. Apparatus for determining the thickness of a coating on a metal substrate, said apparatus comprising
   (a) a first probe for locally heating said coating so as to establish a temperature gradient therein, said first probe being formed from a material having high thermal conductivity and being at least partially plated with a material having high resistance to oxidation and mechanical wear, said plating material comprising a metal selected from the group consisting of platinum, palladium, rhodium, and iridium, said first probe being further disposed so as to provide an electrical contact to said coating,
   (b) a second probe disposed so as to provide an electrical return contact to said coated substrate,
   (c) means for controllably heating said first probe so as to maintain the temperature thereof at about 450 degrees C.
   (d) heat flow means to determine heat flow from said first probe to said coating,
   (e) synchronus detector electric circuit means for measuring the thermoelectric voltage between said first and second probes,
   (f) calculating means for determining the mean value and the variance for a plurality of said measured thermoelectric voltages.
   (g) comparison means for comparing said measured thermoelectric voltage to a plurality of predetermined values which represent known coating thicknesses, and,
   (i) conversion means for converting said measured thermoelectric voltage to a binary logic signal.

2. An apparatus for determining the thickness of a coating on a metal substrate comprising
   (a) a first probe for locally heating said coating so as to establish a temperature gradient therein,
   (b) said first probe being formed from a material having high thermal conductivity and being at least partially plated with a material having high resistance to oxidation and mechanical wear, said plating material comprising a metal selected from the group consisting of platinum, palladium, rhodium, and iridium,
   (c) a second probe disposed so as to provide an electrical return contact to said coated substrate,
   (d) heating means for controllably heating said first probe to a temperature of about 450 degrees C.
   (e) synchronous detector electric circuit means for measuring the thermoelctric voltage between said first and second probe,
   (f) said electrical circuit means including
      (1) converting means for converting said thermoelectric voltage into an AC signal,
      (2) amplifying means for amplifying said AC signal,
      (3) rectifying means for rectifying said AC signal,
   (g) heat flow means to determine heat flow from said first probe to said coating,
   (h) calculating means for calculating the mean value and the variance for a plurality of said measured thermoelectric voltages,
   (i) comparison means for comparing said measured thermoelectic voltage to a plurality of predetermined values which represent known coating thicknesses, and
   (j) conversion means for converting said measured thermoelectric voltage to a binary logic signal.

3. Apparatus for determining the thickness of a coating on a metal substrate, said apparatus comprising,
   (a) a first probe configured so as to be rollable along the surface of said coating
   (b) said first probe being formed a material having high thermal conductivity and being at least partially plated with a material having high resistance to oxidation and mechanical wear, said plating material comprising a metal selected from the group consisting of platinum, palladium, rhodium, and iridium,
   (c) a second probe disposed so as to provide an electrical return contact to the said coating,
   (d) heating means for controllably heating said first probe to maintain a temperature thereof at about 450 degrees C.
   (e) heat flow means to determine heat flow from said first probe to said coating,
   (f) voltage measuring means for measuring the thermoelectric voltage between said first and second probes,
   (g) means for determining the speed of rotation of said rollable probe,
   (h) means for measuring the true coating thickness from said measured thermoelectric voltage and from said speed of rotation of said probe.

4. The apparatus of claim 3 wherein said first probe comprises:
   a probe housing; and
   a generally spherically shaped probe ball disposed in said probe housing so as to be rotatable about an axis which extends in a horizontal direction with respect to said probe housing.

5. The apparatus of claim 4 wherein said means for determining said speed of rotation comprises:
   means for optically detecting rotation of said probe ball;
   means for converting said optical detection into an electrical signal; and
   means for time integrating said electrical signal.

6. The apparatus of claim 3 wherein said means for determining said true coating thickness comprises a microprocessor.

7. A method for determining the thickness of a coating on a metal substrate, said method comprising
   (a) controllably heating a first probe so as to maintain the temperature thereof at about 450 degrees C.,
   (b) said first probe being formed from a material having high thermal conductivity and being at least partially plated with a material having high oxidation resistance and mechanical wear, said plating material comprising a metal selected from the group consisting of platinum, palladium, rhodium, and iridium,
   (c) disposing said first probe so as to provide an electrical contact with said coating and establish a temperature gradient therein,
   (d) disposing a second probe so as to provide an electrical return contact to said coated substrate, and
   (e) measuring the thermoelectric voltage between said first and second probes when said first probe is disposed in electrical contact with said coating,
   (f) comparing the measured thermoelectric voltage to a plurality of predetermined voltages which represent known coating thicknesses.

8. A method for determining the thickness of a metal coating on a substrate, said method comprising
   (a) controllably heating a first probe to maintain the temperature thereof at about 450 degrees C.,
   (b) said first probe being formed of a material having high thermal conductivity and being at least partially plated with a material having high oxidation resistance and mechanical wear, said plating material comprising a metal selected from the group consisting of platinum, palladium, rhodium and iridium,
   (c) disposing said heated first probe so as to provide an electrical contact with said coating and establish a temperature gradient therein,
   (d) disposing a second probe so as to provide an electrical return contact to said coated substrate,
   (e) measuring the thermoelectric voltage between said first and second probes when said second probe is disposed in electrical contact with said substrate and,
   (f) comparing the thermoelectric voltage obtained when said second probe is in electrical contact with said coating to the thermoelectric voltage obtained when said second probe is in electrical contact with said substrate.

9. The method of claim 8 further comprising converting the measured thermoelectric voltage to a binary logic signal which represents the presence or absence of a coating having a specified thickness.

10. The method of claim 8 further comprising:
    moving said first probe along the surface of said coating;
    determining the speed of movement of said probe along said surface; and
    determining the true coating thickness from the measured thermoelectric voltage and from the speed of movement of said probe.

11. A method of determining the thickness of a coating on a metal substrate comprising
    (a) controllably heating a first probe so as to maintain the temperature thereof at a predetermined value of about 450 degrees C.
    (b) said first probe being formed from a material having high thermal conductivity and being at least partially plated with a material having high resistance to oxidation and mechanical wear, said plating material comprising a metal selected from the group consisting of platinum, palladium, rhodium, and iridium,
    (c) disposing said first probe so as to provide an electrical contact to said coating and to locally heat said coating to establish a temperature gradient therein,
    (d) disposing a second probe so as to provide an electrical return contact to said coated substrate,
    (e) measuring the thermoelectric voltage between said first and second probes when said first probe is disposed in electrical contact with said coating,
    (f) calculating the mean value and the variance for a plurality of measured thermoelectric voltages,
    (g) comparing the measured thermoelectric voltage to a plurality of predetermined values which represent known coating thicknesses.

12. The method of claim 11 wherein said first probe comprises:
    a probe housing; and
    a generally spherically shaped probe ball disposed in said probe housing so as to be rotatable about axis which extends in a horizontal direction with respect to said probe housing.

13. The method of claim 12 wherein said step of determining said speed of movement comprises:
    optically detecting rotation of said probe ball;
    converting said optical detection into an electrical signal; and
    time integrating said electrical signal.

* * * * *